(12) United States Patent
Welsko

(10) Patent No.: US 12,238,231 B1
(45) Date of Patent: Feb. 25, 2025

(54) METHOD AND SYSTEM FOR A SECURE MULTILEVEL NESTED BLOCKCHAIN DATA STORAGE

(71) Applicant: XDev LLC, Windsor Mill, MD (US)

(72) Inventor: Joseph Welsko, Windsor Mill, MD (US)

(73) Assignee: XDev LLC, Windsor Mill, MD (US)

( * ) Notice: Subject to any disclaimer, the term of this patent is extended or adjusted under 35 U.S.C. 154(b) by 0 days.

(21) Appl. No.: 18/809,750

(22) Filed: Aug. 20, 2024

Related U.S. Application Data

(60) Provisional application No. 63/539,707, filed on Sep. 21, 2023.

(51) Int. Cl.
  *H04L 29/06* (2006.01)
  *H04L 9/00* (2022.01)

(52) U.S. Cl.
  CPC ...................... *H04L 9/50* (2022.05)

(58) Field of Classification Search
  CPC ........................................................ H04L 9/50
  See application file for complete search history.

(56) References Cited

U.S. PATENT DOCUMENTS

| | | | |
|---|---|---|---|
| 9,990,504 B1* | 6/2018 | Chapman | H04W 4/023 |
| 10,579,643 B2 | 3/2020 | Madisetti et al. | |
| 10,805,069 B1* | 10/2020 | Irwan | H04L 63/0442 |
| 10,860,259 B1* | 12/2020 | Winarski | G06F 12/121 |
| 10,885,022 B1* | 1/2021 | Tian | G06F 3/061 |
| 10,924,466 B2 | 2/2021 | Biyani et al. | |
| 11,184,171 B2 | 11/2021 | Johnson | |
| 11,509,455 B2 | 11/2022 | Trevethan et al. | |
| 11,552,788 B2 | 1/2023 | Yang et al. | |
| 11,580,075 B2 | 2/2023 | Ramabaja | |
| 2017/0075941 A1* | 3/2017 | Finlow-Bates | H04L 67/104 |
| 2022/0231856 A1 | 7/2022 | Hwang | |
| 2023/0138816 A1 | 5/2023 | Nguyen et al. | |
| 2024/0289784 A1* | 8/2024 | Wright | G06Q 20/38215 |
| 2024/0296447 A1* | 9/2024 | Marsh | G06F 21/64 |

OTHER PUBLICATIONS

Corradini, Enrico, et al. "A two-tier Blockchain framework to increase protection and autonomy of smart objects in the IoT." Computer Communications 181 (2022): 338-356. (Year: 2022).*

* cited by examiner

*Primary Examiner* — Ka Shan Choy
(74) *Attorney, Agent, or Firm* — NEO IP

(57) ABSTRACT

A multi-layer method and system for providing secure storage with data immutability and verified integrity. The system implements a unique multi-layer node, polling server, consensus layer, and master distributed ledger design, with each node containing individual encrypted distributed ledgers aggregated into a singular block by each polling server. Each polling server output is evaluated in the consensus for validity and added to the master distributed ledger design. The present invention increases security by encrypting sensitive data in intermediary polling and validation steps, protecting integrity of data while maintaining chronological time series data and auditability compared to existing database systems and distributed ledger technology.

20 Claims, 4 Drawing Sheets

METHOD AND SYSTEM FOR A SECURE MULTILEVEL NESTED BLOCKCHAIN DATA STORAGE

CROSS REFERENCES TO RELATED APPLICATIONS

This application is related to and claims priority from the following U.S. patent applications. This application claims priority to and the benefit of U.S. Provisional Application No. 63/539,707, filed Sep. 21, 2023, which is incorporated herein by reference in its entirety.

BACKGROUND OF THE INVENTION

1. Field of the Invention

The present invention relates to the field of secure data storage, and more specifically, to multi-layer distributed ledger storage.

2. Description of the Prior Art

It is generally known in the prior art to store data on a distributed ledger, including blockchain.

Prior art patent documents include the following:

US Patent Pub. No. 2023/0138816 for System and method to reach consensus in a multi-chain Internet of Things (IoT) environment by inventors Nguyen, et al., filed Nov. 1, 2021 and published May 4, 2023, is directed to a system configured to assist blockchain-based IoT applications connect with one another and share data securely and privately. The system includes an IoT network configured to interact with a blockchain network. The IoT network includes IoT systems, which include IoT devices that comprise sensors. The blockchain network includes a mainchain and sidechains. Each sidechain includes a consensus protocol that run on each node and is configured to increase data and synchronization between nodes. The consensus protocol utilizes a reasoning mechanism to enable each node to deduce states of events on other nodes, a gossip algorithm to synchronize data between nodes, and a vector clock algorithm in a knowledge graph deployed on every node to allow the event created during synchronization to be linked to the previous two events.

U.S. Pat. No. 11,184,171 for System and methods for multi-variant tracking by inventor Johnson, filed May 24, 2019 and issued Nov. 23, 2021, is directed to a multi-variant tracking system. Independently operated domains can be associated with a cryptographically verifiable ledger represented by a sequence of blocks. The central computing system can receive an alert of a creation of a new block in a cryptographically verifiable ledger associated with a first independently operated domain. The central computing system can determine one or more independently operated domains affected by a change in a first data value of a first type. The central computing system can determine a type of a type of data value associated with other transaction records in each cryptographically verifiable ledger for each of the independently operated domains. The central computing system can convert the change in the first data value of the first type to a corresponding change in a data value of a different type of data value.

U.S. Pat. No. 11,552,788 for Data sharing method, system, electronic device and storage medium thereof by inventors Yang, et al., filed Dec. 8, 2020 and issued Jan. 10, 2023, is directed to a data sharing method, including: building a trust alliance block chain, the trust alliance block chain comprising a main chain and at least one slave chain; each slave chain corresponding to a domain; and each domain comprising a leader node; establishing a virtual slave chain on the trust alliance block chain; designating, by the leader node in each domain, a node as a federated learning node; assigning, by the leader node in each domain, a virtual identity to the federated learning node to join the federated learning node to the virtual slave chain; and performing, by each federated learning node, a joint training on a local federated learning model using data generated in its own domain to establish a public federated learning model, through which data are shared among the domains. The system further provides a data sharing system, an electronic device and a storage medium.

U.S. Pat. No. 10,924,466 for System and method for IoT security by inventor Biyani, et al., filed Jul. 27, 2018 and issued Feb. 16, 2021, is directed to a method and system for enabling IoT security using a decentralized IoT security platform that leverages the advanced communication and blockchain security thread model to protect IoT eco-systems. The platform uses a multi-chain data schema including a device chain and an event chain. The multi-chain data schema uses a time-envelope mechanism to generate an event to connect different device chains and enforce a set of security rules through smart contracts. The method comprising receiving an encrypted block from IoT device with event data and verifying the device signature and identity based on certain rules within the device chain. Further, the method comprising determining access to event chain using previous token, current token and timestamp of the encrypted block and updating the event chain upon access determination. The event chain protects data integrity and confidentiality against malicious packets, unauthorized devices, weak encryption and man-in-the-middle attacks.

U.S. Pat. No. 10,579,643 for Method and system for tuning blockchain scalability, decentralization, and security for fast and low-cost payment and transaction processing by inventors Madisetti, et al., filed Sep. 9, 2019 and issued Mar. 3, 2020, is directed to a method for sharing data between blockchains in a multi-chain network including receiving a first plurality of account addresses associated with first and second blockchains and an account state for each account associated with the first plurality of account addresses, generating a first hash tree comprising a mapping between the first plurality of account addresses and the account states, defining a world state trie, generating a root hash of the world state trie, receiving a first plurality of transactions associated with the first and second blockchains, generating a second hash tree comprising the first plurality of transactions, defining a transactions trie, and generating a root hash of the transactions trie.

U.S. Pat. No. 11,580,075 for Systems and methods of providing immutable records by inventor Ramabaja, filed Sep. 3, 2020 and issued Feb. 14, 2023, is directed to systems and methods of providing immutable records, and immutable ordering of records, in a computing system. The computing system can be a member of a blockchain network of a plurality of blockchains. Each block can include a cryptographic digest (or hash) conforming to a minimum degree of difficulty, a nonce by which the cryptographic digest was generated in conformation with the degree of difficulty, and a list of cryptographic digests of most recent blocks of participating neighbor blockchains. Blocks may be passed between blockchains of the plurality of blockchains, which enables each member of the blockchain network to verify an immutable record of data transactions free of the mutual trust requirement of a typical blockchain environment. In conjunction with the generation of each block, an event record may be entered into an event log of the computing system wherein the block was generated. The event record, which may contain actionable instructions, requests, etc., may be transmitted to computing systems of participating neighbor blockchains, where actionable items may be acted upon. Further, the event logs of each computing system may be exchanged, compared, and adjusted to reflect the earliest appearance of each block of each participating neighbor blockchain.

U.S. Pat. No. 11,509,455 for Blockchain for general computation, by inventors Trevethan, et al., filed Dec. 9, 2019 and issued Nov. 22, 2022, is directed to a computer-implemented method. It may be implemented using a blockchain network such as, for example, the Bitcoin network. The computer-implemented method includes: i) monitoring a computational task distribution system to detect a challenge to a proposer string provided by a proposer computer system in response to a request made by a requester computer system, the request specifying a computational task and a first digital asset associated with the request, the proposer string indicated by a hash of a solution to the computational task, the proposer string specifying a second digital asset referenced in an input to a proposer transaction associated with the proposer string; and ii) as a result of detecting the challenge, at least: a) resolving the challenge using a first blockchain network by at least selecting a solution from a set of solutions provided to the first blockchain network, the set of solutions at least including the proposer string; and b) distributing digital assets from the first digital asset and the second digital asset to one or more parties of the computational task distribution system based at least in part on the solution.

US Patent Pub. No. 2022/0231856 for Verification system and method for chaining data by inventor Hwang, filed Apr. 6, 2022 and published Jul. 21, 2022, is directed to a data processing method performed by a security protocol device. The data processing method includes assigning each of a plurality of leaf nodes of a binary tree stored in a database device an identification number; and performing a first procedure in a case that the security protocol device receives first record data and first identification data of the first record data from a terminal apparatus, the first procedure including: determining a first identification number from the first identification data; storing a hash value of the first record data into a first leaf node of the binary tree identified by the first identification number; generating at least one slice of the binary tree; uploading a root hash value of the binary tree to a blockchain device; and transmitting a first slice to the terminal apparatus, the first slice including the first leaf node. A security protocol device using the same is also provided.

SUMMARY OF THE INVENTION

The present invention relates to the field of secure data storage. Specifically, the present invention relates to multi-layer distributed ledger data storage.

It is an object of this invention to provide a method and system for secure data storage with data immutability.

In one embodiment, the present invention is directed to a multi-layer system for securely storing data on a distributed ledger including a remote server including a processor, a memory, and at least one database, at least one data input device, a multiplicity of polling servers, a consensus layer, a master distributed ledger, wherein the remote server is in network communication with the at least one data input device, wherein the at least one data input device is operable to generate data; wherein the remote server is operable to immutably store data generated from the at least one data input device on a distributed ledger, wherein stored data maintains chronological time series data, wherein the multiplicity of polling servers is operable to aggregate the distributed ledger of the at least one data input device, wherein the multiplicity of polling servers is each operable to generate an aggregated singular block, wherein the consensus layer is operable to receive and analyze consensus of the aggregated singular block of the multiplicity of polling server, wherein the remote server is operable to add the aggregated singular block to the master distributed ledger upon validation of consensus, wherein the master distributed ledger stores all blocks that have reached consensus.

In another embodiment, the present invention is directed to a multi-layer system for securely storing data on a distributed ledger including a remote server including a processor, a memory, and at least one database, at least one data input device, a multiplicity of polling servers, a consensus layer, a master distributed ledger, wherein the remote server is in network communication with the at least one data input device, wherein the at least one data input device is operable to generate data, wherein the remote server is operable to immutably store data generated from the at least one data input device on a distributed ledger, wherein stored data is maintains chronological time series data, wherein stored data is encrypted before being received by the consensus layer, wherein the multiplicity of polling servers is operable to aggregate the distributed ledger of the at least one data input device, wherein the multiplicity of polling servers is each operable to generate an aggregated singular block, wherein the consensus layer is operable to receive and analyze consensus of the aggregated singular block of the multiplicity of polling server, wherein the remote server is operable to add the aggregated singular block to the master distributed ledger upon validation of consensus, wherein the master distributed ledger stores all blocks that have reached consensus.

In yet another embodiment, the present invention is directed to a method for securely storing data on a distributed ledger including at least one data input device generating data, a remote server including a processor, a memory, and at least one database communicating via network with the at least one data input device, the remote server immutably storing data generated from the at least one data input device on a distributed ledger, wherein stored data maintains chronological time series data, a multiplicity of polling servers aggregating the distributed ledger of the at least one data input device, the multiplicity of polling servers generating an aggregated singular block, a consensus layer receiving and analyzing consensus of the aggregated singular block of the multiplicity of polling server, the remote server adding the aggregated singular block to the master distributed ledger upon validation of consensus, a master distributed ledger storing all blocks that have reached consensus.

These and other aspects of the present invention will become apparent to those skilled in the art after a reading of the following description of the preferred embodiment when considered with the drawings, as they support the claimed invention.

DETAILED DESCRIPTION

Figure 1:
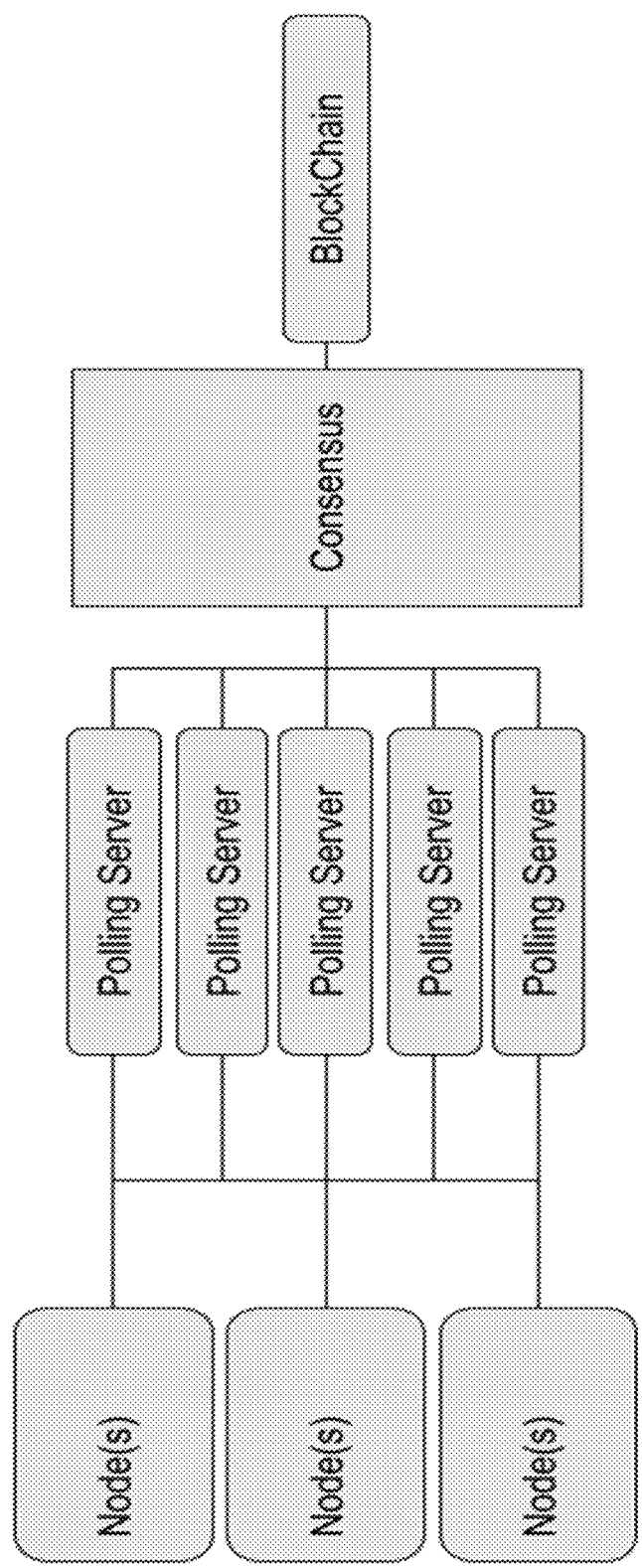
FIG. 1 illustrates a data flow diagram according to the one embodiment of the present invention.

The present invention is generally directed to securely storing data. The invention generally includes multi-layer systems and methods for storing data on a distributed ledger. Traditional relational data storage systems are centralized. The centralized nature creates vulnerability against attacks such as SQL injections. The systems and methods of the present invention provide for improved security and data integrity.

In one embodiment, the present invention is directed to a multi-layer system for securely storing data on a distributed ledger including a remote server including a processor, a memory, and at least one database, at least one data input device, a multiplicity of polling servers, a consensus layer, a master distributed ledger, wherein the remote server is in network communication with the at least one data input device, wherein the at least one data input device is operable to generate data; wherein the remote server is operable to immutably store data generated from the at least one data input device on a distributed ledger, wherein stored data maintains chronological time series data, wherein the multiplicity of polling servers is operable to aggregate the distributed ledger of the at least one data input device, wherein the multiplicity of polling servers is each operable to generate an aggregated singular block, wherein the consensus layer is operable to receive and analyze consensus of the aggregated singular block of the multiplicity of polling server, wherein the remote server is operable to add the aggregated singular block to the master distributed ledger upon validation of consensus, wherein the master distributed ledger stores all blocks that have reached consensus.

In another embodiment, the present invention is directed to a multi-layer system for securely storing data on a distributed ledger including a remote server including a processor, a memory, and at least one database, at least one data input device, a multiplicity of polling servers, a consensus layer, a master distributed ledger, wherein the remote server is in network communication with the at least one data input device, wherein the at least one data input device is operable to generate data, wherein the remote server is operable to immutably store data generated from the at least one data input device on a distributed ledger, wherein stored data is maintains chronological time series data, wherein stored data is encrypted before being received by the consensus layer, wherein the multiplicity of polling servers is operable to aggregate the distributed ledger of the at least one data input device, wherein the multiplicity of polling servers is each operable to generate an aggregated singular block, wherein the consensus layer is operable to receive and analyze consensus of the aggregated singular block of the multiplicity of polling server, wherein the remote server is operable to add the aggregated singular block to the master distributed ledger upon validation of consensus, wherein the master distributed ledger stores all blocks that have reached consensus.

In yet another embodiment, the present invention is directed to a method for securely storing data on a distributed ledger including at least one data input device generating data, a remote server including a processor, a memory, and at least one database communicating via network with the at least one data input device, the remote server immutably storing data generated from the at least one data input device on a distributed ledger, wherein stored data maintains chronological time series data, a multiplicity of polling servers aggregating the distributed ledger of the at least one data input device, the multiplicity of polling servers generating an aggregated singular block, a consensus layer receiving and analyzing consensus of the aggregated singular block of the multiplicity of polling server, the remote server adding the aggregated singular block to the master distributed ledger upon validation of consensus, a master distributed ledger storing all blocks that have reached consensus.

None of the prior art describes a multi-layer distributed ledger method and system including a multiplicity of polling servers which aggregate a multiplicity of nodes' ledgers before sending the aggregated data as a block to the consensus layer for validation.

In today's digital era, data security and storage has become a vital component of business. Traditional database solutions, such as structured query language (SQL) based relational databases are centralized and use a client-server architecture. These traditional databases are prone to security breaches, are non-transparent, and prone to failure. Distributed ledger technology (DLT) is a next generation type of distributed database that operates without a central authority and replicates an identical copy of data to a non-hierarchical network of nodes that communicates with each other over peer-to-peer protocols. Distributed ledgers are also characterized by the immutability and data transparency. While DLT are most notable for securely storing transactional data, DLT can also be flexibly applied to other types of data such as carbon credits, energy generation, server-status logs, uptime tracking, and manufacturing tracking across multiple facilities or assembly lines. Among the different forms of DLT, blockchain has become a dominant ledger in the industry. Other known types of DLT, such as IOTA Tangle, implement alternative structures like directed acyclic graphs. Traditional DLT systems (e.g., blockchain) store data in only one location within the chain, creating vulnerability to data tampering at the initial data collection stage before entry of data onto the chain. This is because, while DLT ensures immutability once the data is present on chain, there is no cross-verification of data before the addition to the chain. Additionally, blockchain requires consistent internet access to store data on the chain, becoming unreliable for remote areas with insecure network connection.

Therefore, there is a need for a method and system that includes additional security measures. The present invention addresses this need by implementing encryption at the data generation stage by placing data generated from a data input device onto a decentralized ledger to avoid single failure points. There is also a need for a data storage system allowing greater transparency and auditability. The present invention fulfills this need through its immutable and chronological data storage. This invention improves upon existing data storage systems and DLT to prevent data tampering, protect data integrity, and enable greater levels of auditability. The present invention is operable to provide secure data storage, immutability, and integrity for a wide range of applications, including but not limited to, energy meters, home appliances, healthcare systems, manufacturing, and/or transportation networks. The present invention severely mitigates the impact and scope of vulnerability to data tampering by the polling servers gathering data across many time intervals and implementing aggregated nested chains. Furthermore, the present invention is operable to accommodate system with intermittent network connection while maintaining secure data storage. The present invention is operable under intermittent network connections as the data generated from the polling servers is operable to be manually migrated from an offline device and server to a storage system and server with network connection at a set interval of time.

The present invention is related to multi-layer distributed ledger data storage system, which adds a greater degree of auditability to end-point generated data by implementing multiple data aggregation and validation layers. In one embodiment, the present invention aggregates data from a multitude of data input devices and/or individual databases. In one embodiment, the data input devices are Internet of Things (IoT) devices, such as power meters, smart watches, and/or any sensor-based object operable to exchange data over the internet. In one embodiment, the present invention is operable to receive a plurality of data from various IoT devices and store the data on a DLT. At least one node of the DLT is operable to receive the data from the data input device and/or database and immutably and chronologically record specific information and data that pertains to the exact IoT devices in use on to a distributed ledger. In one embodiment, at least one active node is operable to receive data from at least one data input device as data is being produced, write the data on to a local distributed ledger, and send the recorded distributed ledger to the multiplicity of polling servers. In one embodiment, the recording of data on the distributed ledger is operable to be completed automatically through smart contracts and/or through a local connection. In one embodiment, the present invention includes a plurality of polling servers (collectively "the polling server level"), operable to record data of the DLT nodes in the chronological order that they are received (from the IoT devices). At the polling server level, the plurality of polling servers are operable to receive, process, compress, and aggregate a multiplicity of the chains from the nodes into a singular block. In one embodiment, the present invention includes a consensus layer operable to receive data from the polling server level, compare, and evaluate consensus of the outputs from all polling servers; once consensus is verified, the verified data is added to a consensus layer ledger with pointers to lower-layer ledgers once validity and integrity has been established. Lastly, the verified block, containing the aggregated distributed ledgers from a multiplicity of nodes, is added to the master distributed ledger.

Referring now to the drawings in general, the illustrations are for the purpose of describing one or more preferred embodiments of the invention and are not intended to limit the invention thereto.

The present invention is directed towards a secure multi-layer distributed ledger data storage method and system including at least one data input device. The at least one data input device is otherwise known as nodes of a distributed ledger but will be primarily referenced as a data input device or IoT device. The present invention also includes at least one lower-level distributed ledger, a multiplicity of polling servers, a consensus layer, and a master distributed ledger. The present invention protects against data tampering by implementing a DLT recording step at the data capture step prior to being added to a "master" ledger following consensus.

Figure 2:
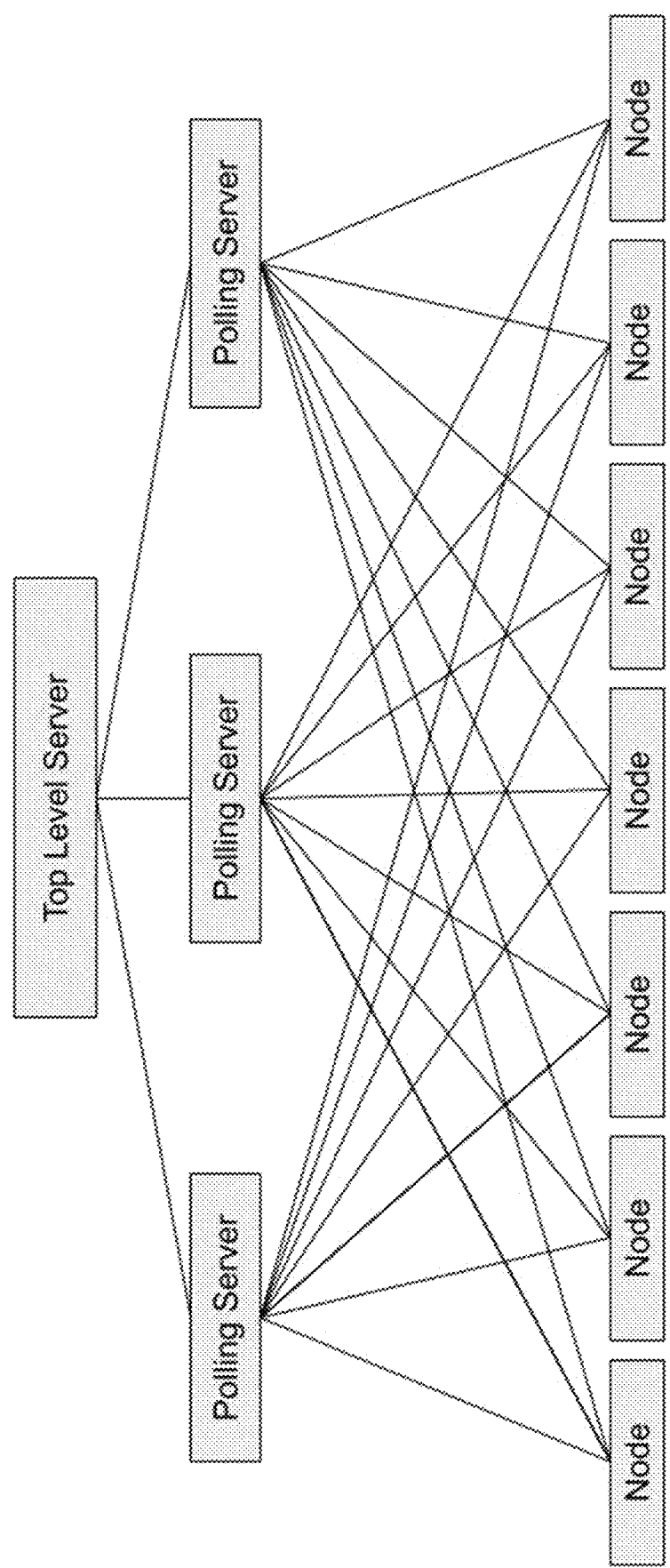
FIG. 2 illustrates a data flow diagram of the data flow from the nodes to the polling servers to the consensus and master distributed ledger according to one embodiment of the present invention.
Figure 3:
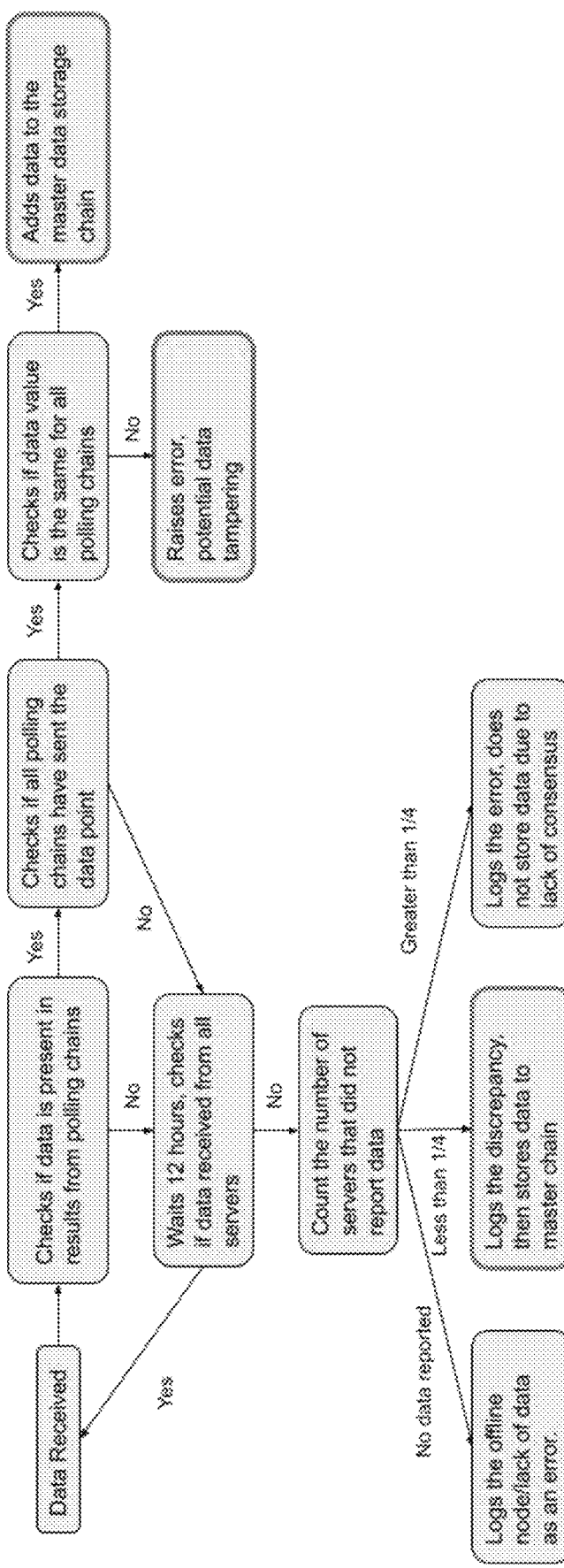
FIG. 3 illustrates a logical flow diagram of the consensus layer according to one embodiment of the present invention.

As illustrated in FIG. 1, FIG. 2, and FIG. 3, in one embodiment, a master distributed ledger stores all blocks that have reached consensus. Throughout this disclosure the master distributed ledger may be referred to as a master ledger, master chain, or top-level chain. In one embodiment, a master distributed ledger is included in the top-level server.

As illustrated in FIG. 1, in one embodiment, the distributed ledger is blockchain ledger. FIG. 1 illustrates the multi-layer system of the present invention in which, from a multiplicity of nodes, each corresponding lower-level distributed ledger is aggregated by each polling server. FIG. 1 further illustrates the consensus layer receiving each aggregated output from each polling server, and the master blockchain receiving the validated output block following consensus.

In one embodiment, the present invention includes a multilayer system and method designed to securely and immutably store data on a distributed ledger. In one embodiment, the present invention includes at least one data input device and/or database operable to output data, a smart contract and/or manual system operable to receive data from the at least one data input device, encrypt the data, and immutably record the encrypted data on a distributed ledger while maintaining chronological time series, at least one node containing the distributed ledger of the encrypted data from the at least one data input device and/or database, a polling server level comprising a multiplicity of polling servers, a consensus layer, and a master distributed ledger. In one embodiment, the system is operable to use all types of distributed ledgers and blockchain networks known in the art including public, private, and hybrid systems. In one embodiment, encryption of data is performed using any encryption algorithms and methods known in the art including the SHA-256 hashing algorithm. In the preferred embodiment, the present invention utilizes a private distrusted ledger.

In one embodiment, at least one data input device is an IoT sensor, a database, or any other system or device operable to access the internet and capture data known in the art. In one embodiment, the present invention includes at least one smart contract operable to store data pertaining to the exact data input device in use on a distributed ledger automatically through self-executing code, smart contracts, and/or manually. In another embodiment, the at least one input device is operable to generate, encrypt data, and place the encrypted data on a distributed ledger automatically through self-executing code, smart contracts, or manually. This is advantageous to existing systems since sensitive data is encrypted early and throughout the validation process, increasing security. Notably, traditional blockchain systems, while maintaining an immutable record of data once recorded on-chain, does not include a mechanism for ensuring data security prior to it being recorded on chain. Advantageously, by including a DLT on the node level, the present invention can ensure data security at the data capture level.

In one embodiment, a node is a data input device. In one embodiment, the present invention is operable with a multiplicity of nodes. In one embodiment, there is at least one node. In one embodiment, each data input device is a node. In one embodiment, a node includes a multiplicity of data input devices.

In one embodiment, the nodes of the present invention are operable to connect to existing relational database technologies, including structured query language (SQL) databases, such as, MySQL, PostgreSQL, MICROSOFT SQL Server, and/or ORACLE DB, wherein the database provides the data of the nodes of the present invention.

In one embodiment, the nodes of the present invention are operable to connect to existing database technologies, including NoSQL databases, such as, MONGODB, APACHE CouchDB, ORACLE NoSQL, RAIK and/or INFINITEGRAPH databases, wherein the database provides the data of the nodes of the present invention.

As illustrated in FIG. 2, in one embodiment, each of the multiplicity of polling servers is operable to receive and aggregate the data of the multiplicity of nodes and output the aggregation to the top-level server (i.e., the consensus layer and master ledger). Advantageously, each individual polling server of the plurality of polling servers is operable to receive data associated with each individual node of the plurality of nodes. This provides for cross-checking each node to ensure data consistency. The polling servers are operable to cross-compare the data of the plurality of nodes with each other to ensure data consistency. In one embodiment, the multiplicity of polling servers is the polling server level. In one embodiment, the top-level server is a centralized access point to the multiplicity of polling servers. In one embodiment, each polling server is operable to receive a ledger (i.e., a chain for blockchain) from each node and aggregate the data of all nodes while maintaining chronological time series data. In one embodiment, each polling server is operable to receive a ledger such as a chain for blockchain, from each node and aggregate the data of a multiplicity of nodes while maintaining chronological time series data. In one embodiment, the multiplicity of polling servers reach the nodes at different time intervals and captures any changes made across time, increasing security by adding new layers of complexity and increasing frequency of data addition to ledger to deter data tampering. In one embodiment, each polling server is operable to maintain a separate chain of aggregated lower-level distributed ledgers. In one embodiment, the polling server level is operable to aggregate the data of a lower level blockchain into a single data point and/or single node. In one embodiment, each polling server is operable to output an aggregated singular block entry of nested aggregated chains.

Traditional DLT only allows for data to be added to a chain without additional references to the source data. In one embodiment, each polling server is operable to send the aggregated singular block entry of nested aggregated chains to the consensus layer, using multiple ledgers. This is advantageous to existing DLT as nested aggregated chains stores the source of data at each point of generation and cumulatively stores multiple references to the data across multiple chains while maintaining chronology, creating a trail of data. This trail of data can be established from the master distributed ledger to the original point of generation including the stored value, accounting from the point of generation to the final location of storage, thus featuring greater auditability. In one embodiment, the multiplicity of polling servers is operable to store and display the progression of data. In one embodiment, the polling server level is operable to immutably aggregate the data of a lower level blockchain (i.e., from at least one node of the plurality of nodes) into a single data point and/or single node and send the aggregated data to each of the multiplicity of polling servers. In one embodiment, each polling server is operable to check for consensus among its own version of the aggregated data and the plurality of received aggregated data from other polling servers. In one embodiment, each polling server of the plurality of polling servers is operable to compare its data of the plurality of nodes to that of the other polling servers in order to ensure data consistency. In one embodiment, each polling server is operable to output results of the consensus among polling servers to the top level server where the top level server performs an additional check for consensus between the results received from each polling server. In one embodiment, the multiplicity of polling servers is operable to receive and aggregate the lower-level distributed ledgers from the at least one data input device, create a singular aggregated block, and send the singular aggregated block to the consensus layer at automatically a set interval. In one embodiment, each polling server is operable to locally maintain the aggregated chain and stores a copy of the master distributed ledger. In one embodiment, the polling server is operable to perform consensus operations on the data of the plurality of nodes. In one embodiment, the polling servers are operable to interact with the plurality of nodes despite intermittent internet access. In this embodiment, the polling servers is operable to be manually migrated from an offline device and server to a storage system and server with network connection at a set interval of time. In one embodiment, the multiplicity of polling servers is operable to perform digital network monitoring and facilities/systems monitoring.

In one embodiment, the present invention is operable to validate the data of the plurality of IoT devices for input into a master ledger, such that the validated data is properly in consensus. This process is illustrated by FIG. 3. As illustrated in FIG. 3, in one embodiment, the consensus layer receives data from the multiplicity of polling servers and is operable to check if data is present in results from outputted polling chains from the polling servers. If data is not present, meaning the received output from the polling chain is empty for reasons such as the aggregation not having been performed or intermittent internet access, the system waits 12 hours to receive data. If data is received from all servers within 12 hours, the system returns to the data received step and proceeds with the consensus evaluation. If data is not received after 12 hours, the system counts the number of servers that did not report data. In one embodiment, if the number of servers reports no data after waiting 12 hours, the system logs the offline node and the lack of data as an error. In one embodiment, the log indicating the lack of data as an error is a security alert system which is not recorded on a distributed ledger and takes forms such as a JSON file. In one embodiment, the waiting time period is customizable (i.e., greater or less than 12 hours). In one embodiment, the present invention is operable to send a notification, push-notification, and/or email indicating the presence of the error. In one embodiment, if the number of servers that did not report data is less than ¼, the system logs the discrepancy and stores data to master chain (i.e., the master distributed ledger). In one embodiment, the discrepancy is logged on the distributed ledger. In one embodiment, the criteria of the percentage of polling servers that did not report data is customizable (i.e., greater or less than ¼). In one embodiment, if the number of servers that did not report data is less than ¼, the system logs the discrepancy and proceeds with the remaining operation flow: checking if all polling chains that did report data have sent the data point, checking if data value is the same for all reported polling servers, and adding data to the master data storage chain if consensus is reached and raising an error indicating potential data tampering if consensus is not reached. If data is present in results from polling chains, the consensus algorithm proceeds to check if all polling chains have sent the data point. If confirmed, the system proceeds to check if data value is the same for all polling chains, evaluating the consensus. If consensus is reached, the system adds the data to the master data storage chain (i.e., the master distributed ledger). In one embodiment, the data added to the consensus layer chain includes pointers to lower-layer chains for potential future validation. In one embodiment, these pointers references the data points within the ledgers of the polling servers and the nodes as each layer points down to the preceding layer. In one embodiment, pointers at the master distributed ledger are represented as a list of polling servers containing the same data value. In one embodiment, if consensus is reached, the validated data is added to the consensus layer with pointers to lower-layer chains. In one embodiment, if consensus is reached, the validated data is added to the master distributed ledger with pointers to lower-layer chains. If consensus is not reached, the system raises error indicating potential data tampering. In one embodiment, a polling server is randomly selected to perform the consensus. In one embodiment, the consensus layer rectifies the lower-level distributed ledger from the multiplicity of polling servers and any invalid hashed or security keys. In one embodiment, the present invention is designed to be a private data-storage ledger system and thus performs all verification and authentication internally by the multiplicity of polling servers and top-level server. In one embodiment, the present invention does not implement a traditional proof of work consensus system used by traditional DLT. In one embodiment, the present invention implements elements of the proof of stake system such as validating transactions before adding data to a distributed ledger by confirming that an established set of rules are met such that all data is accounted for and valid at lower levels.

Figure 4:
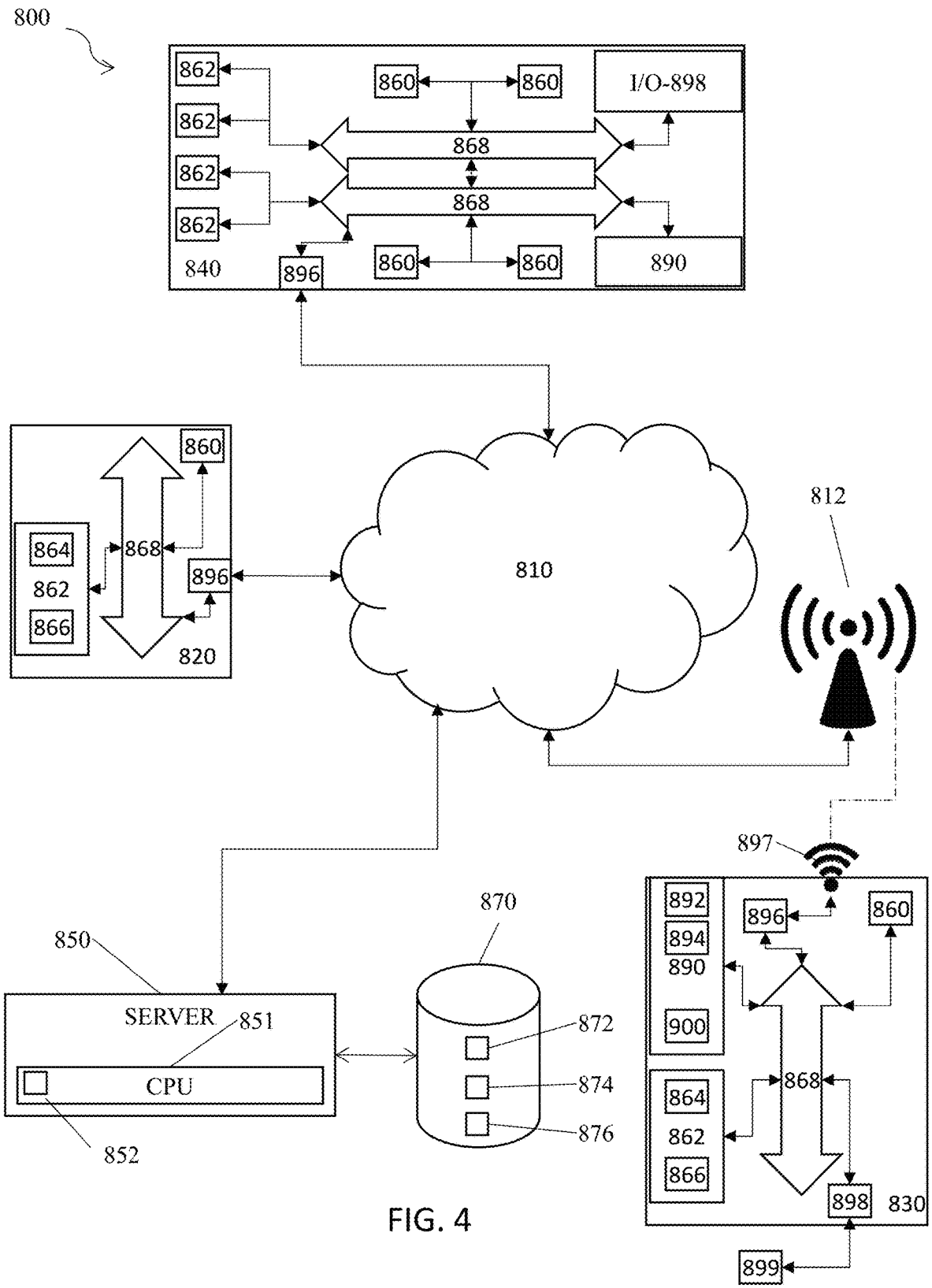
FIG. 4 is a schematic diagram of a system of the present invention.

FIG. 4 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 4, is operable to include other components that are not explicitly shown in FIG. 4, or is operable to utilize an architecture completely different than that shown in FIG. 4. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in *The Business of Blockchain* by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BITCOIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A multi-layer system for securely storing data on a master distributed ledger comprising:
 a remote server including a processor, a memory, and at least one database;
 at least one data input device;
 a multiplicity of polling servers, wherein each polling server includes a processor and a memory;
 a consensus layer; and
 a master distributed ledger;
 wherein the remote server is in network communication with the at least one data input device;
 wherein the at least one data input device generates and encrypts data;

wherein the remote server is operable to immutably store the encrypted data from the at least one data input device on a lower-level distributed ledger, wherein the stored encrypted data maintains chronological time series data;

wherein the multiplicity of polling servers is operable to aggregate the stored encrypted data on the lower-level distributed ledger;

wherein the multiplicity of polling servers is further operable to generate an aggregated singular block of data and output the aggregated singular block of data to the consensus layer;

wherein the consensus layer is operable to receive and analyze consensus of the aggregated singular block of data, wherein the remote server is operable to add the aggregated singular block of data to the master distributed ledger upon validation of consensus; and wherein the master distributed ledger stores all blocks that have reached consensus.

2. The multi-layer system of claim 1, wherein the at least one input device is operable to record the encrypted data on the lower-level distributed ledger automatically through self-executing code or smart contracts.

3. The multi-layer system of claim 1, further comprising at least one smart contract, wherein execution of the at least one smart contract causes the data generated from the at least one data input device to be stored on the lower-level distributed ledger.

4. The multi-layer system of claim 1, wherein the remote server is operable to reach at least one data input device at a different time interval than the remote server is operable to reach at least one additional data input device, wherein the remote server records any changes made over time.

5. The multi-layer system of claim 1, wherein a first polling server of the multiplicity of polling servers is operable to compare a first data received from the at least one data input device to a second data received from the at least one data input device by a second polling server of the multiplicity of polling servers.

6. The multi-layer system of claim 1, wherein the system is operable to provide an error message indicating potential data tampering if consensus is not reached.

7. The multi-layer system of claim 1, wherein the consensus layer includes proof of work, proof of stake, delegated proof of stake, proof of space, proof of capacity, proof of activity, proof of elapsed time, and/or proof of authority consensus.

8. A multi-layer system for securely storing data on a master distributed ledger comprising:
a remote server including a processor, a memory, and at least one database;
at least one data input device;
a multiplicity of polling servers, wherein each polling server includes a processor and a memory;
a consensus layer; and
a master distributed ledger;
wherein the remote server is in network communication with the at least one data input device;
wherein the at least one data input device is operable to generate and encrypt data;
wherein the remote server is operable to immutably store the encrypted data from the at least one data input device on a lower-level distributed ledger;
wherein the multiplicity of polling servers is operable to aggregate the stored encrypted data;

wherein the multiplicity of polling servers is further operable to generate an aggregated singular block of data;

wherein the consensus layer is operable to receive and analyze consensus of the aggregated singular block of data, wherein the remote server is operable to add the aggregated singular block of data to the master distributed ledger upon validation of consensus; and wherein the master distributed ledger stores all blocks that have reached consensus.

9. The multi-layer system of claim 8, wherein the at least one input device is operable to record the encrypted data on a lower-level distributed ledger automatically through self-executing code or smart contracts.

10. The multi-layer system of claim 8, wherein the remote server is operable to reach at least one data input device at a different time interval than the remote server is operable to reach at least one additional data input device, wherein the remote server records any changes made over time.

11. The multi-layer system of claim 8, wherein a first polling server of the multiplicity of polling servers is operable to compare a first data received from the at least one data input device to a second data received from the at least one data input device by a second polling server of the multiplicity of polling servers.

12. The multi-layer system of claim 8, wherein the system is operable to provide an error message indicating potential data tampering if validation of consensus is not reached.

13. The multi-layer system of claim 8, wherein the consensus layer includes proof of work, proof of stake, delegated proof of stake, proof of space, proof of capacity, proof of activity, proof of elapsed time, and/or proof of authority consensus.

14. The multi-layer system of claim 13, wherein the system is operable to implement elements of a proof of stake system, including transaction validation before adding data to a master distributed ledger.

15. A method for securely storing data on a master distributed ledger comprising:
at least one data input device generating and encrypting data;
a remote server including a processor, a memory, and at least one database communicating via network with the at least one data input device;
the remote server immutably storing data generated from the at least one data input device on a lower-level distributed ledger, wherein stored data maintains chronological time series data;
a multiplicity of polling servers aggregating the stored data on the lower-level distributed ledger of the at least one data input device;
the multiplicity of polling servers generating an aggregated singular block of data;
a consensus layer receiving and analyzing consensus of the aggregated singular block of data;
the remote server adding the aggregated singular block of data to the master distributed ledger upon validation of consensus; and
a master distributed ledger storing all blocks that have reached consensus.

16. The method of claim 15, further comprising the at least one input device placing the encrypted data on the lower-level distributed ledger automatically through self-executing code or smart contracts.

17. The method of claim 15, further comprising the remote server reaching the at least one data input device at a different time interval then the remote server reaches at least one additional data input device, wherein the remote server records any changes made over time.

18. The method of claim 15, further comprising each polling server of the plurality of polling servers comparing a first data received from the at least one data input device to second data received from the at least one data input device by a second polling server of the multiplicity of polling servers.

19. The method of claim 15, further comprising providing an error message indicating potential data tampering if validation of consensus is not reached.

20. The method of claim 15, wherein the consensus layer includes proof of work, proof of stake, delegated proof of stake, proof of space, proof of capacity, proof of activity, proof of elapsed time, and/or proof of authority consensus.

* * * * *